(12) United States Patent
Duprey et al.

(10) Patent No.: US 8,819,362 B1
(45) Date of Patent: Aug. 26, 2014

(54) MANAGING REPLICATION AND RESERVATIONS

(75) Inventors: Dennis T. Duprey, Raleigh, NC (US); Miles A. De Forest, Bahama, NC (US)

(73) Assignee: EMC Corporation, Hopkinton, MA (US)

( * ) Notice: Subject to any disclaimer, the term of this patent is extended or adjusted under 35 U.S.C. 154(b) by 507 days.

(21) Appl. No.: 12/411,561

(22) Filed: Mar. 26, 2009

(51) Int. Cl.
*G06F 12/00* (2006.01)
*G06F 12/16* (2006.01)

(52) U.S. Cl.
USPC ............ 711/162; 711/161; 711/163; 711/167

(58) Field of Classification Search
USPC .................................. 711/161, 162, 163, 167
See application file for complete search history.

(56) References Cited

U.S. PATENT DOCUMENTS

| | | | |
|---|---|---|---|
| 2006/0242211 A1* | 10/2006 | Becker et al. | 707/204 |
| 2007/0156957 A1* | 7/2007 | MacHardy et al. | 711/114 |
| 2008/0126734 A1* | 5/2008 | Murase | 711/170 |
| 2008/0229048 A1* | 9/2008 | Murase et al. | 711/171 |
| 2009/0327577 A1* | 12/2009 | Fitzgerald | 711/101 |

* cited by examiner

*Primary Examiner* — Yong Choe
(74) *Attorney, Agent, or Firm* — Krishnendu Gupta; Jason A. Reyes; John T. Hurley

(57) ABSTRACT

A method is used in managing replication and reservations. An amount of data storage space at a destination data storage location is determined that corresponds to expected successful completion of a data replication operation in which data is written to the destination data storage location. It is determined whether a thin provisioning reservation based on the amount can be made successfully at the destination data storage location. Based on whether the thin provisioning reservation can be made successfully, it is determined whether to proceed with the data replication operation.

20 Claims, 9 Drawing Sheets

| PRODUCTION DATA VOLUME ADDRESS | SAVE VOLUME ADDRESS |
|---|---|
| A7-00-F9-6B | B9-45-67-E8 |
| 9D-8B-31-0C | 8A-AA-3E-44 |
| 5F-F5-73-AB | 00-00-00-00 |

FIG. 3

MANAGING REPLICATION AND RESERVATIONS

TECHNICAL FIELD

The subject matter described herein relates to managing replication and reservations.

BACKGROUND

Storage devices are employed to store data that are accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller. A storage device may also be accessible over a network. Examples of such a storage device include network attached storage (NAS) and storage area network (SAN) devices. A storage device may be a single stand-alone component or be comprised of a system of storage devices such as in the case of Redundant Array Of Inexpensive Disks (RAID) groups.

For mission-critical applications requiring high availability of stored data, various methods for enhancing data reliability are typically employed. One such method is to provide a "mirror" for each storage device. In a mirror arrangement, data are written to at least two storage devices. Thus, data may be read from either of the two storage devices so long as the two devices are operational and contain the same data.

In general, copying data from a first location (e.g., including one or more data volumes) to a second may be done for a myriad of reasons, including replication and backup/versioning. In a replication operation, a data set may be copied from the first location to the second to ensure that the second is a mirror of the first and that each stores a copy of the data set such that if there is a failure that results in the data set being inaccessible from the first location, the second is available for access. In a backup/versioning operation, a "copy on write" method can be employed such that changes to the data set made after the point in time result in copies of the original data that was stored in the first data volume at the point in time being copied to a save volume—a data volume acting as, for example, a backup location—before being overwritten in the first volume. In this way, the data set can be "rolled back" to the point in time.

One illustrative method for forming a point in time copy of a data set is referred to as a snapshot and is described in detail in U.S. Pat. No. 6,792,518 to Armangau et al., which is incorporated herein by reference in its entirety.

A snapshot does not replicate a full copy of the data set (referred to as a production data set). Rather, the snapshot only stores differences between a current version of the production data set and the version of the data set at the point in time when the snapshot was taken. In the implementation described in the '518 patent, the snapshot maintains several data structures, including a block map. When a snapshot is created at time T=0, these data structures, including the block map, may be empty, and they are populated when the data set is written to after the creation of the snapshot. For example, when contents of a first data block in the production data set are about to be changed as a result of a data write operation conducted after time T=0 (e.g., time T=0.5), the original contents of the data block are copied to a save volume such that a copy of a state of the data block at the time the snapshot was created (i.e., the contents of the data block at time T=0) is maintained. An entry is then placed into the block map linking the data block in the save volume to its corresponding position in the point in time data set that the snapshot represents. This can be repeated over time, for each change made to the production data set after the snapshot was created, such that the block map contains an entry for each changed data block.

The block map of the snapshot can then be used at a later time (e.g., time T=10) to determine the state of production first data set at the time the snapshot was created (time T=0) even if it has changed since T=0. To do so, a read operation to the snapshot for a selected data block will access the block map to determine if the block map contains an entry for that selected data block. If so, it can be determined that the selected data block changed after the snapshot was created and that the data stored in the production data set is not the data that was stored in the selected data block at time T=0. The information stored in the entry in block map will then be accessed to determine the location of the corresponding data and will read the data from the save volume that is the data that was stored in the selected data block in the first data volume at time T=0. If, however, there is no entry in the block map for the selected data block, then it can be determined that the data did not change after the creation of the snapshot, and that the data stored in the production data set is the data that was stored at time T=0. Accordingly, the data can be read from the production data set.

Multiple snapshots can also be created at different times, and can work together in a serial fashion so that only the most recently created snapshot directly tracks changes to the production data set. For example, if a data block was overwritten after time T=0 but also after time T=1, when a second snapshot was created, the snapshot at time T=0 may not reflect that the selected data block was changed, but the snapshot created at time T=1 will. The snapshot created at time T=1 may have its own block map containing addresses of data blocks on the save volume storing the contents of data blocks overwritten after time T=1. In response to a read operation, carried out at time subsequent to T=1 to the snapshot at time T=0, it may be determined from the snapshot at time T=1 that the selected data block in the production volume was overwritten subsequent to T=0, so that the data block that existed at T=0 can be retrieved (using the block map for snapshot T=1), from the save volume.

As should be appreciated from the foregoing, snapshots can be used to determine previous states of a data set at past times without needing to make a full copy of the data set at those past times. Instead, only the "deltas" or differences are stored in snapshots.

In general, a data replication system can provide a duplicate copy or replica of changing data on a storage device. Write commands issued to a primary storage device are duplicated and issued to the data replication system, which records the written data in its own storage medium. Sophisticated data replication systems store not only a current duplicate copy of the primary device but also allow additional past-time images of the primary device to be accessed. This may be done through "journaling," where the write commands themselves are archived, rather than simply a copy of the data.

Sometimes, however, communication to the data replication system is lost. This may be for a variety of reasons. For example, a physical connection with the device hosting the data replication system may be broken, or communication software may malfunction. When this happens, a data replication system will be out of synchronization with the primary storage device. Some reconciliation process is necessary to restore synchronization between the data replication system and the primary storage device.

Data storage operations for writing the copy in the mirror can be handled in either a synchronous manner or an asynchronous manner. In conventional synchronous mirroring, the primary storage device ensures that the host data has been successfully written to all secondary storage devices in the mirror and the primary storage device before sending an acknowledgment to the host, which can result in relatively high latency, but ensures that the primary storage device and all secondary storage devices are updated before informing the host that the write operation is complete. In asynchronous mirroring, the primary storage device sends an acknowledgment message to the host before ensuring that the host data has been successfully written to all secondary storage devices in the mirror, which results in relatively low latency, but does not ensure that all secondary storage units are updated before informing the host that the write operation is complete.

A consistency group is a collection of related volumes that need to be kept in a consistent state. A consistency transaction set is a collection of updates to the primary volumes such that dependent writes are secured in a consistent manner. Consistency groups maintain data consistency across volumes.

Conventionally, storage systems provide logical volumes (LUs or LUNs) to host computers by statically assigning storage areas of disk drives. A storage capacity of the disk drives assigned to the LUs may be larger than a storage capacity to be actually used by the host computer, which is called over provisioning. This is because the storage capacity to be used by the host computer cannot be grasped with accuracy. Also, operation costs required for changing LU capacities are high.

As a way for addressing overprovisioning, there is a known concept called thin provisioning. The storage systems provide volumes realized by the thin provisioning (thin provisioning volume: TPLU) to the host computers. Thus, the host computers recognize the TPLUs provided by the storage systems as volumes having a storage capacity larger than that of the disk drives actually assigned to the respective TPLUs.

Upon reception of a write request to a TPLU from the host computer, the storage system dynamically assigns an unwritten storage area of a storage pool to the TPLU requested for data write.

SUMMARY

A method is used in managing replication and reservations. An amount of data storage space at a destination data storage location is determined that corresponds to expected successful completion of a data replication operation in which data is written to the destination data storage location. It is determined whether a thin provisioning reservation based on the amount can be made successfully at the destination data storage location. Based on whether the thin provisioning reservation can be made successfully, it is determined whether to proceed with the data replication operation.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a block diagram of one data structure that may be used for storing information relating to changes made to a data volume in accordance with some embodiments of the invention;

DETAILED DESCRIPTION

Figure 1:
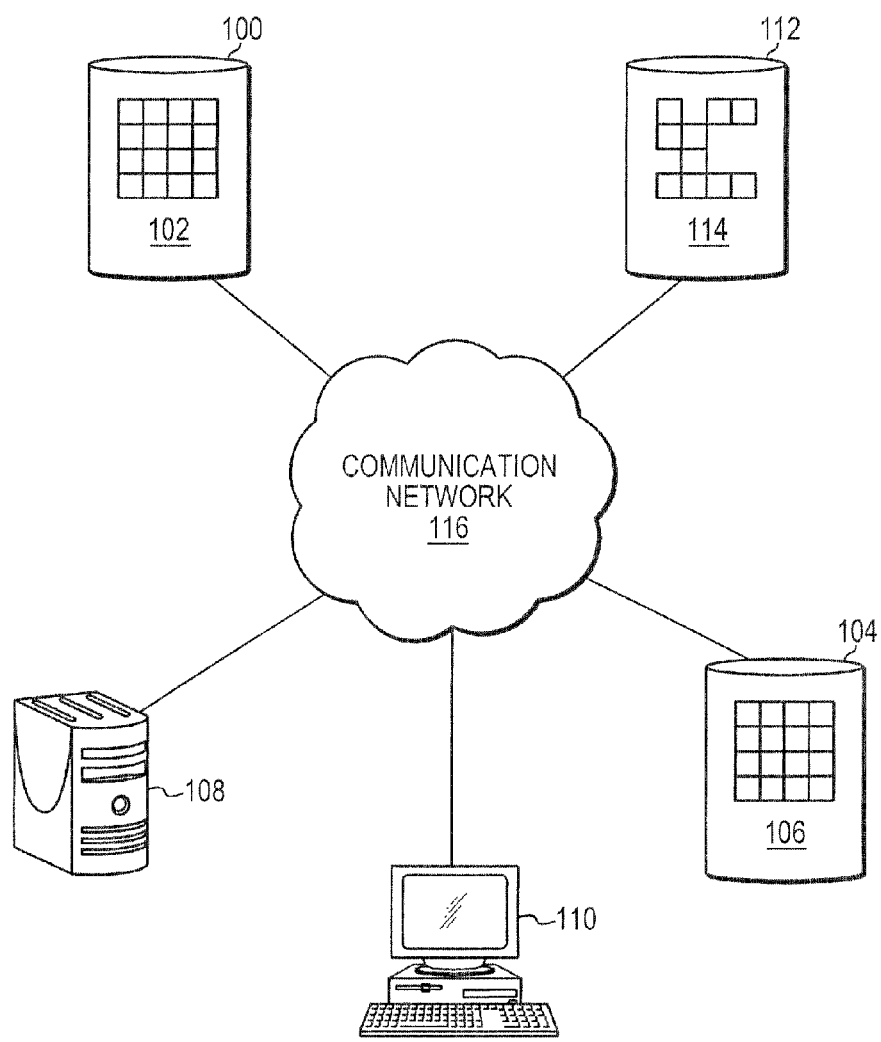
FIG. 1 illustrates an exemplary computer system on which some embodiments of the invention may be implemented.

Described below is a reservation-based replication technique that may be used in replication data transfer failure avoidance on thinly provisioned LUNs. Some storage systems allow space to be reserved for a particular thinly provisioned LUN such that the consumed space is guaranteed not to fail a write request up to the size of the reservation. For example, if a thinly provisioned LUN (TPLU) is created with a 1 TB reported size and a 100 GB reservation on the TPLU, the TPLU is guaranteed to be able to consume up to 100 GB without undue risk of having a write request fail due to lack of available storage. The 100 GB reservation request would fail if there were not 100 GB of available storage, and it also reduces the amount of storage available to other TPLUs by 100 GB. Reservations can be changed (or removed) at any time. In the meantime, if other TPLUs in the same provisioned storage container for TPLUs (e.g., storage pool) grow and expand, they will run out of space even though there is 100 GB of space that the first TPLU is not using. (Storage pools are described in more detail below.) In at least some implementations, the reservation is not an allocation—it merely blocks other TPLUs from using the space.

At least one implementation of the technique takes advantage of this reservation mechanism to avoid unnecessary (and costly) replication data transfers if the transfer could fail due to lack of available storage at a thinly provisioned destination. In accordance with the technique, before a mirror or clone synchronization/update is started, a reservation is set on the mirror secondary or clone (also referred to as destination, remote, target, mirror, replica, or secondary volume, image, or LUN, or replication volume) to reflect the consumed size of the primary mirror or clone source (also referred to as local or production or primary volume, image, or LUN). This prevents starting a synchronization operation that would fail because the secondary or clone does not have enough available storage to accommodate the request. The reservation operates under a use-first reservation model such that the TPLU initially consumes any reserve space; it does not compete with other TPLUs for free pool space until after it consumes all of its reserve space.

In accordance with the technique, replica synchronizations and updates can be prevented from starting if there is not enough available storage to allow them to complete successfully, and storage can be reserved for the replica before starting the synchronization/update to avoid other competing consumers of available storage to cause a synchronization or update to fail after it is started.

A thinly provisioned LUN has both a reported size and a consumed size whereas the reported size may be much greater than the consumed size. This enables user to overprovision LUNs and defer the actual addition of additional storage until when the consumed storage nears the size of the available physical storage. Given this mechanism, conventionally it is possible for a thinly provisioned LUN to fail a write request because there is no more available storage.

The state of the clone or mirror secondary represents a write ordered consistent replica of the source or mirror primary at a previous point in time before the synchronization operation is started. On at least some storage systems, once a synchronization operation is started, the replica is no longer consistent with the source or mirror primary until the synchronization is completed. If it were allowed to start and failed due to insufficient available storage, the clone or mirror secondary would be unusable until more storage was made available and the synchronization operation was continued. This could be particularly problematic in disaster recovery configurations. Furthermore, by use of the technique, the storage system and network resources needed to perform a data transfer that was going to fail before it could complete can be avoided.

Use of the technique with synchronous mirrors and clones is beneficial but not to the same degree as when it is used with asynchronous mirrors and clones. With synchronous mirrors and clones, the synchronization may still fail due to lack of available storage as there could be writes during the synchronization operation which could cause more storage to be consumed on the mirror secondary or clone which was not reserved when the synchronization operation was started. For periodic incremental updates used by a type of asynchronous mirrors and copy operations, a frozen write ordered consistent image of the data is used as the source of the transfer. The consumed storage of this frozen source is known before the update and does not change while an update is in progress. Therefore, with the frozen source, using reservations on the destination of the copy during an update can guarantee that the transfer will not fail due to lack of available storage.

The amount to request in the reservation request may depend on the type of replication used and the stage of replication. For example, at least initially, the replication may require copying the entire or nearly the entire written contents of the primary volume to the secondary volume, which require a reservation request of a substantial size.

In the case of mirrors and clones, a reservation is a request to hold a specific amount of space for a TPLU from a free pool. If the reservation succeeds, the TPLU is guaranteed to be able to grow its consumed space by the reserved amount.

Figure 9:
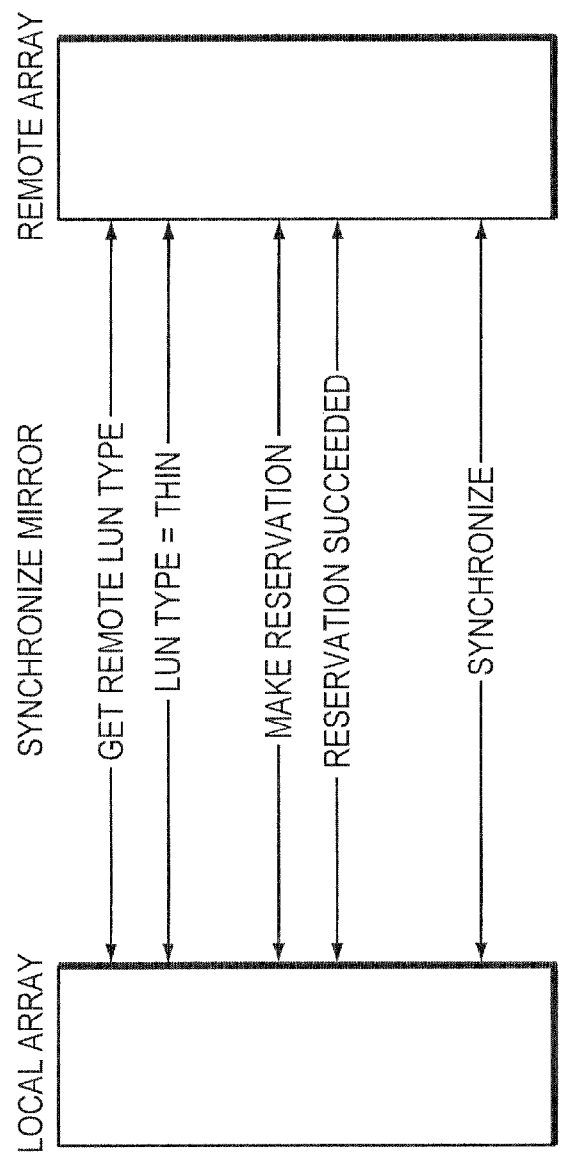

In accordance with the technique as described in more detail below, with reference to FIG. 9, once a secondary LUN is chosen, the local storage system ("array") determines whether the secondary LUN is thin or not. In at least some mirroring implementations, when a secondary LUN is added, an option is presented to the user regarding whether data needs to be synchronized from the primary to the newly added secondary (it is not necessary to synchronize the data for an initially provisioned primary and secondary LUN). If the secondary LUN is thin, and "synchronization required" is chosen, a reservation request is made for sufficient free pool space on the remote array. If the reservation request fails, the secondary is not added because the initial synchronization will fail. If the secondary is added without "synchronization required", the secondary is added because it is not certain that later synchronizations will fail.

Individual asynchronous mirrors can be synchronized manually or at scheduled intervals. For either type of synchronization, a reservation is made for pool space on the remote array, if the secondary LUN is thin. If the reservation is made on the remote array, the synchronization is guaranteed not to fail due to an out of space condition on the remote array. If the reservation cannot be made, the mirror synchronization will not start because therefore it is guaranteed to fail.

Consistency groups can also be synchronized manually or at intervals. The reservation process works similarly for groups. If any member of the group cannot get a reservation, the synchronization will not start because it is guaranteed to fail.

If it is possible to communicate with the remote array, the reservations on the secondary LUN removed under any of these conditions:
1. when the synchronization completes
2. when the secondary LUN is added (any existing customer created reservation would be removed)
3. when the secondary LUN is removed
4. when the mirror is administratively fractured (deliberately de-linked).

If it is not possible to communicate with the remote array, the reservations remain until communications are restored and one of the above conditions is met or a new reservation is set.

Where the primary LUN is a TPLU, if "initial synchronization required" is selected when adding a secondary LUN, the local array attempts to make a reservation for space on the secondary LUN. The remote array reserves an amount equal to the consumed space on the primary LUN less the consumed space on the secondary LUN. If the reservation fails, the secondary is not added and an error is returned. If "initial synchronization required" is not selected, no reservation is made before the secondary is added. After the synchronization completes, the reservation is removed from the secondary LUN.

Where the primary image LUN is a traditional LUN, if "initial synchronization required" is selected when adding a secondary image, the local array sends a message to the remote array with a reservation request for the size of the entire primary image LUN. If the reservation fails, the secondary is not added. After the synchronization completes, the secondary image is fully allocated. The reservation is removed.

With respect to synchronizing a consistency group, if any reservation fails as described above, the synchronization does not start.

Now described is an example using a specific type of replication and storage system, but it is to be understood that this is merely an example. The technique is suitable for use with many types of asynchronous and synchronous mirroring and clones, including asynchronous mirroring in which a snapshot is taken and the snapshot is used as the source for replication, and also asynchronous mirroring in which the snapshot is used as a map for replication in which the production volume is used as the source for replication, as in the example now described.

In general, in replication processes, two or more data sets are maintained in a mirrored state such that there is a redundant copy of the data stored in the data set. A replication process may be synchronous (i.e., data is stored to the mirror as it is committed to the production data set) or asynchronous. Asynchronous replication volumes may therefore be a few seconds, minutes, or even hours out of sync with the data volume, according to the particular replication processes implemented.

Snapshots may be used advantageously in a different way (e.g., rather than to perform backup/versioning, they may be used to facilitate replication). In this respect, one of the characteristics of the block map created for a snapshot is that it includes entries that track blocks that have changed subsequent to the time that the snapshot was created. Thus, by employing a series of snapshots separated based upon any desired time interval, as discussed in more detail below, the block maps for the snapshots can be used to identify the data blocks that have changed during any particular time interval, and can be used to replicate the newly-changed data blocks to a replication data set.

Any time a write is performed to a production data set, an entry was made for any written data blocks in the block map for the corresponding snapshot and the corresponding data blocks that are overwritten are copied to the save volume.

When a snapshot facility is used to support a replication process, all changes made to a data set preferably should be tracked such that all new data written to the data volume may be replicated to the replication volume.

With respect to snapshots used to support replication, when new data is written to the data set after the creation of a snapshot, the block map and save volume are updated. For example, when the data set is a file system, a snapshot utility can be employed that treats all write operations that write to data blocks used by the file system irrespective of whether those data blocks were allocated to the file system and included valid data at the time snapshot was created. When such a snapshot utility is employed to support replication, the block map or a snapshot includes an accurate indication of any blocks written with new data subsequent to the time that the snapshot were created and can be employed to identify new data to be transferred to the target location by the replication process.

Replication processes as described herein are for creating, managing, and using snapshots that store information relating to changes made to both previously-allocated and newly-allocated storage units.

As used herein, a "snapshot" is any suitable collection of data structures that creates a copy-on-write point in time copy of a data set and store information relating to changes made to one or more data sets that affect both data units that store valid data for the data set when snapshot is created and those that do not. A snapshot may be associated with a point in time—for example, the time it was created or applied—and adapted to store information regarding changes made to a data set after that point in time. The data set for the snapshot may be specified in any suitable manner, including by specifying some collection of logically related storage objects (e.g., a file system or database), one or more volumes of storage, or in any other suitable manner. The data structures may include a data unit map that identifies data units (e.g., data blocks or other subfile data units) that have changed subsequent to creation of the data snapshot and an associated data state storing valid data overwritten after creation of the snapshot. In the case of a newly-allocated data unit (e.g., a block allocated to a file system after creation of the snapshot), the data unit may include an identifier for the data unit and an indication that it is newly-allocated. This indication may take any suitable form, including a null value or blank indication, a reserved value marking it as a newly-allocated data unit, or an identifier for one or more reserved data units in the save volume with which newly-allocated storage units are associated.

In some illustrative embodiments described below, the data set for which a snapshot is taken to support replication is a file system and the data units therefore are referred to as data blocks that are allocated to the file system. Correspondingly, the data structures that support the snapshot are referred to as a block map and a save volume. However, it should be appreciated that these are merely examples, and that the aspects of the technique described herein can be used in connection with creating snapshots to support replication for other types of data sets. In addition, the level of data units that are tracked as being changed need not correspond to data blocks, but can be any suitable data unit, with the data structure referred to as a "block map" being merely illustrative of any suitable type of data unit map. Similarly, it should be appreciated in the embodiments of the technique described herein are not limited to use with a snapshot facility that employs particular data structures identified as a block or data unit map and a save volume, and can be used with snapshot facilities that employ any suitable type of data structure or structures. In some implementations, a snapshot may be adapted to be used only by replication processes, and as such may only store information which is to be used by a replication process. However, in accordance with other embodiments of the technique, a snapshot that is used by a backup/versioning process or any other data copying operation may also be used to support a replication process, and accordingly the snapshot may store information usable by both types of processes. Such implementations may be advantageous in some, but not all, environments because the processing load associated with creation and maintenance of snapshots may be shared between the different types of operations, such that no redundant operations are performed by creating parallel snapshots (e.g., a snapshot for replication and a snapshot for backup/versioning).

As discussed above, in one illustrative embodiment, a replication process may be supported by a snapshot implemented to track changes made to a data set (referred to as a production volume because it is capable of receiving writes) that is divided into a plurality of storage units known as data blocks. As with conventional snapshots, when a write operation makes a change to the data set that results in contents of a previously-used data block being modified, the original contents of the data block may be copied to a storage location (e.g., a "save volume") that supports the snapshot, and an entry may be placed in a block map identifying both the changed data block in the production volume and the data block in the save volume storing the original data. For example, the block map may include the address of the data block in the production volume and the address of the data block in the save volume. When a write operation makes a change to the production volume that results in data being stored in a data block that was not previously used (e.g., where the snap is of a file system and the block was unallocated), then an entry may also be placed in the block map. However, as there is no need to copy and store the original contents of the data block—as there were no valid original contents—the entry placed into the block map may be different. This entry may instead identify the new data block in the production volume by storing, for example, the address of the data block in the production volume, and may indicate that it is a newly-used data block by including in the place of the identifier for a block in the save volume one or more reserved values indicating that it is newly-used.

In accordance with some embodiments, one or more replication processes can then be performed using the information stored in the block map to identify changed data units. All of the entries in a block map for a snapshot relate to data units that have been changed on the production volume since the snapshot was created, so accessing the block map provides a quick and simple way to identify each of the changed storage units and, accordingly, identify the location of all of the new data on the production volume that should be replicated to the replication location. The replication may use the identifiers for all the changed blocks on the production volume to retrieve the new data on the production volume, and the new data may then be copied to the replication location to ensure that the replication location is a mirror of the production volume after each of the write operations that changed the production volume are completed. In addition, the save volume also includes all of the original data that existed on the production volume when the snapshot was created but was overwritten, so that the snapshot can be used not only to support a replication process, but also to provide a valid point in time copy of the production volume for any other suitable purpose (e.g., backup/versioning).

The illustrative example provided above is a fairly simple one, wherein only a single snapshot is created and can be used by a replication process to identify data units that have changed subsequent to the creation of the snapshot. The aspects of the technique described herein are not limited to such a simple implementation, as numerous other implementations (examples of which are discussed below) are possible. For example, as discussed above, some snapshot utilities provide the capability to create a series of snapshots and record changes to the production volume only in the most recently-created snapshot, so that if it is desired to determine which data blocks have changed subsequent to creation of a particular snapshot that is not the most recent, the block maps for that snapshot and any snapshots created later in time may be consulted, and such a snapshot facility can be used to support replication using the technique described herein. Similarly, in accordance with at least some implementations using the technique, a series of alternating snapshots can be created to support a replication process, such that a snapshot can be created at a particular time to track changes to the data set subsequent to that time, a replication process can replicate those data blocks to bring the target volume into synchronization with the production volume, and a new snapshot can be created to track changes to the production volume from that point forward.

The aspects of the technique described herein may be implemented in environments including data storage systems having one or more data volumes storing data in any suitable manner. In some implementations, a data storage system may be a local data storage system, wherein storage components of a computing device are accessible to other components of the computing device such as a processor. In other implementations, a data storage system may include a computer communication network, and data volumes may be accessible over the network using any suitable storage networking protocol. These storage networking protocols may include Storage Area Network (SAN) protocols, Network-Attached Storage (NAS) protocols, or any other suitable storage networking protocol. In implementations that use these protocols, data access operations may be exchanged over the network in any suitable manner, including according to the Common Internet File System (CIFS) protocol, the Network File System (NFS) protocol, or any other suitable protocol.

A data storage system may include any suitable number of data volumes. A data volume may be any suitable entirety or portion of a logical grouping of data, and may be implemented on one or more computer-readable storage media such as hard disk drives. A data storage system may comprise any suitable number of data volumes used for any suitable reason. For example, a data storage system may have one or more production volumes storing data, and one or more replication volumes to which changes made to the data volumes are replicated such that the replication volumes mirror the data volumes as closely as possible. In some implementations, a data volume may be both a production volume that can receive changes from one or more sources and a replication volume, in that changes made to another data volume are replicated to it, such as in the case where data may be written to any of a plurality of data volumes and changes are replicated to others in the plurality of data volumes. A data storage system may also include data volumes used for any other reason, including save volumes.

A data volume may comprise a plurality of data units of any suitable size. In some implementations, these data units may each be a predetermined amount of bits and/or bytes of available storage, such as a data block. In some implementations, storage of data into one or more data blocks may be managed by a storage management facility. A storage management facility may be any suitable module that tracks allocation of data units and stores data relating to a data content unit in one or more data units.

Any suitable type of data may be stored by storage units of data volumes. In some implementations, "data" may comprise records storing information to be manipulated and/or computer-executable instructions to be executed by one or more processors. The data may be accessed by any suitable data access operation. Data access operations include any suitable action for interacting with data, including read operations reading data stored in one or more storage units, write operations writing data to one or more storage units, and observation actions determining properties of data stored in one or more storage units.

Storage units (also referred to herein as data units) to which information is written by a write operation (e.g., a data block) are described herein as being "previously allocated" if the data unit, at the time of the write operation, stores valid data for the data storage system (e.g., if it is allocated to a file system). Accordingly, a previously-allocated data block is one that contains valid data that is overwritten during a write operation and is to be maintained by the snapshot to ensure an accurate certain point in time copy is maintained for the data set, as opposed to one that did not store data at the time of the write operation. A data unit is described herein as "newly allocated" if the storage unit did not store valid data for the data set that is overwritten in response to a unit operation. It should be appreciated that "newly allocated" does not require that the data unit never held valid data; a newly-allocated data unit may be one that stored valid data at some time in the past but at the time the write operation is executed did not. For example, when the data set is a file system, a data block may be allocated to the file system at one point, became freed up (i.e., unallocated) at a later point, and then be allocated again and unwritten to. It should be further appreciated that, in some data storage systems, a storage unit may always hold a value, but that value may not be valid data—a storage unit may not be storing valid data when the value is merely a residual of data previously stored but is not reflective of valid data for the data set. For example, a value may not be data when the value stored in the storage unit was not the result of a write operation to the data set or when the storage unit was the subject of a delete or move operation that resulted in de-allocation of the storage unit such that the value in the storage unit is no longer reflective of valid data for the data set.

In data storage systems which implement a file system and divide data volumes into data blocks, a data block is previously allocated when it was allocated to the file system and stored valid data for the file system when a write operation to the data block occurs, and may be newly allocated when it was not allocated to the file system or storing valid data at the time a write operation to the data block occurs.

At least one illustrative implementation will now be described. However, these are merely examples as the aspects described herein are not limited to these or any other specific implementations.

Embodiments operating in accordance with the technique described herein can be implemented in any suitable computer system comprising any suitable number and type(s) of computing devices, including any suitable number and type of network resources. FIG. 1 shows an illustrative computer system on which embodiments of the technique may be implemented. It should be appreciated, however, that other implementations may operate in any other suitable computer system.

The computer system of FIG. 1 comprises a production data volume 100 comprising a plurality of storage units 102. In this and other examples described below, storage units may be described as data blocks, but it should be appreciated that a data volume may be divided into any other suitable storage unit. The data volume 100 is connected to and accessible by a communication network 116. Communication network 116 may be any suitable wired and/or wireless network, including a portion of a larger wired and/or wireless network, such as a home network, a subnet of an enterprise network, the Internet, or others. The computer system further comprises a replication volume (TPLU) 104 that comprises a plurality of data blocks 106. Replication volume 104 may be maintained as a mirror of data volume 100 through the use of replication processes that employ a snapshot facility as described herein. When maintained as a mirror, the data blocks 106 of the replication volume 104 are copies of the data blocks 102 of the data volume 100. As discussed above and described in greater detail below, the data blocks 106 may be periodically updated by a replication process with new data written to the data blocks 102, such that at any given time the data blocks 106 may be a slightly outdated copy of the data blocks 102.

The computer system of FIG. 1 further comprises a file system server 108 managing the data blocks of the production data volume 100. The file system server 108 may manage allocation of the data blocks 102 and create a file system interface to other components within the computer system to store data related to one or more files managed by the file system. In response to a write operation, the file system server 108 may allocate, in any suitable manner, one or more data blocks 102 to store data related to a file. While the production volume 100 is shown connected directly to the communication network 116, it should be appreciated that when a file system server 108 provides a file system interface for the data stored therein, the production volume 100 may not be directly accessible to other computers in the computer system, and may be accessible indirectly only via the file system interface.

Write operations may be performed in any suitable manner. For example, the computer system may comprise a client computing device 110 that is interacting with the data volume 100 via the file system server 108 and performing data access operations. These operations may be transmitted from the client computing device 110 to the file system server 108 via the communication network 116. The file system server 108 may then determine one or more blocks that are accessed as a result of the data access operation by consulting metadata stored by the file system server 108 concerning allocation of data blocks to files. In the event of a read operation, the contents of the data blocks related to a file may be retrieved from the data volume 100 and provided to the client computing device 110. In the event of a write operation, the file system server 108 may store the new data to be written by the write operation in either a previously-allocated data block or a newly-allocated data block from among the data blocks 102.

In at least one implementation in accordance with some of the principles described herein, the file system server 108 may host and execute a snapshot facility adapted to generate one or more snapshots to track changes made to a file system presented by the file server 108 and/or the data volume 100, and a replication facility adapted to use the snapshot(s) to replicate changes made to a file system and/or the underlying data volume 100 to the replication volume 104, such that the data blocks 102 and data blocks 106 are kept synchronized. The snapshot and replication facilities may operate in any suitable manner. In some embodiments, as with conventional snapshot operations, the snapshot facility module may use a save volume 112, comprising data blocks 114, as a storage location for data following some write operations. The data stored in the save volume 112 may be the original data stored in a previously-allocated data block when a write operation is performed that changes the contents of the previously-allocated data block. This may be done for backup/versioning operations, such that original copies of data may be maintained for later use, or for any other reason.

Figure 2:
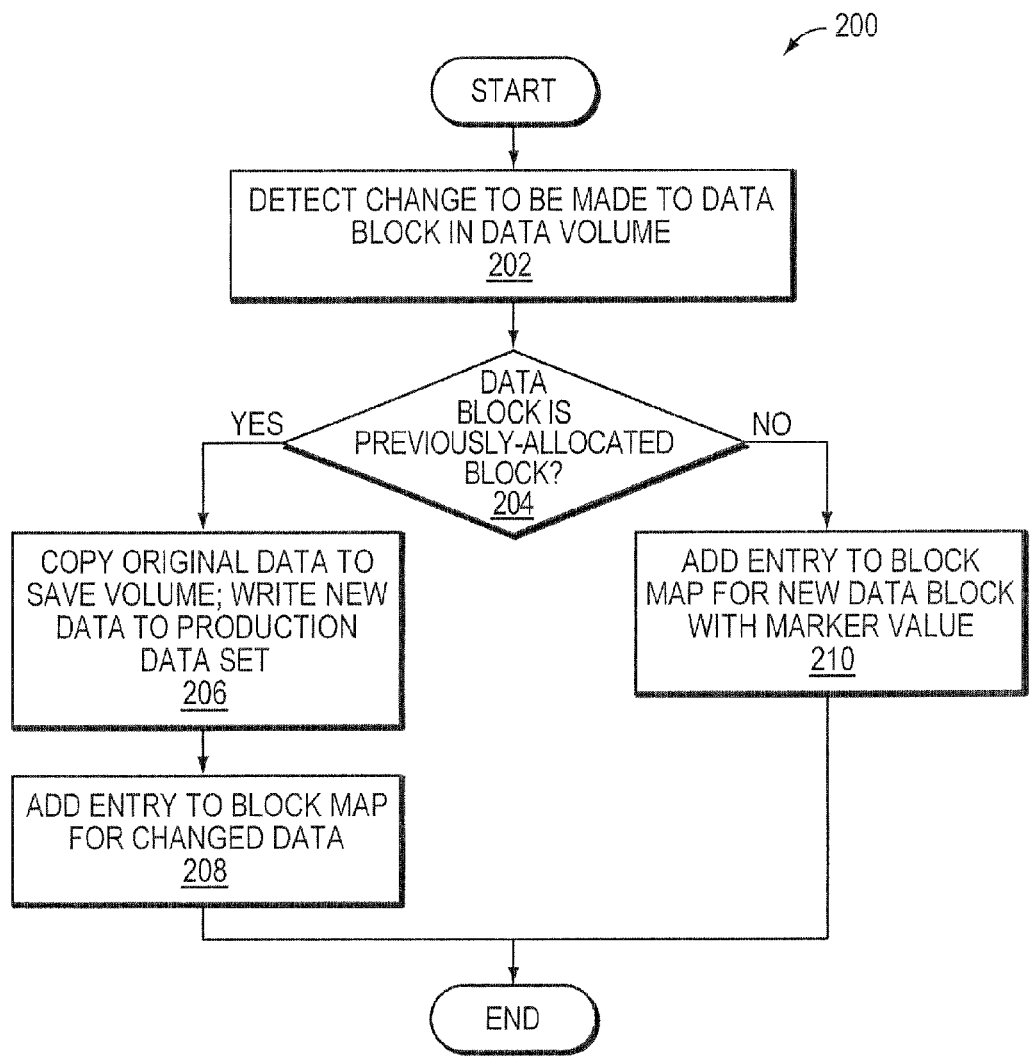
FIG. 2 is a flowchart of one illustrative technique for detecting and storing information relating to changes made to a data volume that may be implemented in accordance with some embodiments of the invention.

FIG. 2 shows a flowchart of one exemplary process that may be used by a snapshot facility implemented in accordance with some embodiments to track changes made to a production data volume such that these changes may be quickly and efficiently replicated to a replication volume by a replication facility. A snapshot facility may be implemented to track changes in any suitable manner, including tracking changes according to both conventional processes and processes operating in accordance with the technique described herein. It should be appreciated that the process shown in FIG. 2 is only illustrative of the processes that may be implemented in accordance with the technique described herein. Further, it should be appreciated that while the process 200 of FIG. 2 will be described with reference to the computer system of FIG. 1, process 200 is not limited to operating in a computer system of the type shown in FIG. 1, as the process 200, like all of the processes described herein, is not limited to operating in any particular type of computer system.

The process 200 of FIG. 2 begins in step 202, in which a snapshot facility detects a change to be made to a data block of the production data volume 100. The change to be made could be prompted by any suitable action that results in a modification of the contents of at least one data block of the production data volume 100. For example, the action could be a data access operation, such as a write operation, requested by the client computing device 110 and transmitted to the file system server 108. In step 202, a snapshot facility, executing on the file system server 108 or in communication with it, may detect that the write operation to be executed by the file system server 108 will result in a change made to at least one data block of the data blocks 102 of the production data volume 100.

In step 204, the snapshot facility determines whether the particular data block is a data block that was previously-allocated or newly-allocated. As described above, a previously-allocated data block may be one that, at the time of a change, was storing valid data, and a newly-allocated data block may be one that was not storing valid data at the time of the change. In this case, determining whether a data block is previously-allocated may comprise examining metadata stored by the file system of the file system server 108. The metadata of the file system may indicate an allocation of the data blocks 102 to one or more files managed by the file system (i.e., where the file(s) are stored on the data volume), and may thus indicate whether the particular data block was storing valid data for the file system, making it a previously-allocated data block, or whether the particular data block was not storing valid data for the file system, making it a newly-allocated data block. It should be appreciated, however, that determining whether a data block was previously allocated may be done in any suitable manner.

If it is determined in step 204 that the data block being analyzed was previously allocated, then in step 206 the snapshot facility may track and store information relating to the change in steps 206 and 208. In step 206, the original contents—the data of the data block of the production data volume 100 prior to the change—are copied from the data block to one of the data blocks 114 of the save volume 112. Once the original data is copied to the save volume 112, the new data may be permitted to be written to the production data block in the data volume 100.

In step 208, an entry is placed into a block map for the snapshot reflecting the change to the production data volume 100. The block map may be in any suitable format for tracking changes made to a data volume and may store any suitable information. One example of a block map is shown in data structure 300 in FIG. 3. In the exemplary block map 300, identifiers for the data blocks of both the production data volume 100 and the save volume 114 that are associated with a change may be stored in the block map 300. These identifiers may be the addresses for the data blocks. For example, the production data volume address may be the address of the data block of the production data volume 100 to which the data was written in the write operation, and the save volume address may be the address in the save volume of the data block storing the original contents of the data block of production data volume 100. Depending on the size of the data volumes, these addresses may be any suitable length. In some implementations, addresses of data blocks may be 32 bits in length, such that the data structure 300 may store 64 bits for each entry: a 32-bit address for the production data volume 100 and a 32-bit address for the save volume 112. For context, the example of FIG. 3 shows 32-bit addresses that may be held by a block map implemented as data structure 300, but it should be appreciated that this implementation is only illustrative and that any suitable data may be maintain by a block map.

In addition to storing any suitable information, the data structure of a block map may be implemented in any suitable manner. For example, the block map may be implemented using the known Btree data structure. Btrees offer fast access to data for a variety of reasons, and a binary search may be used to read from and/or write to the contents of the Btree. Btrees and binary searches are known in the art and will not be discussed further herein. It should be appreciated that Btrees are merely one illustrative data structure that may be employed to implement a block map and that binary searches are merely one way for searching a block map data structure, as the aspects of the technique described herein are not limited to use with any particular type of data structure to implement the block map, nor to any particular way for searching for identifiers of particular data volumes in a block map.

If it is determined in step 204 that the particular data block is not a previously-allocated block—and is thus a newly-allocated block—then the snapshot facility may track and store information relating to the change in step 210. In step 210, an identifier for the newly-allocated data block is placed into a block map for the snapshot. In some implementations, the identifier for the newly-allocated data block comprises an indication that the data block is newly-allocated. The indication may be any suitable information, including a marker value. In the example of FIG. 3, the entry 302 may be used as the indication. The entry 302 may be one or more reserved values placed into the save volume address field for an entry in the data structure 300. The reserved value(s) may appear to be an address for a data block in the save volume 112, but may be recognized as an indication that the data block is newly-allocated and that, accordingly, there is no data in the save volume 112 related to the data block in the data volume 100.

Once the block map is updated in either of steps 208 or 210, the process 200 ends.

The process 200 of FIG. 2 may be executed for a single data block of a production data volume 100 to which a modification is made. Following creation of a snapshot for the production data volume 100, the process 200 may be repeated for each data block affected by changes to the production data volume 100, which may include multiple blocks for a single write operation, as well as multiple blocks for multiple different write operations. Operating a snapshot facility in this manner results in the creation of a block map having an entry for every data block that has been changed on the production data volume since creation of the snapshot, including both previously-allocated and newly-allocated data blocks. As discussed in further detail below, these entries may then be used by a replication module to identify all changes that have been made to the production data volume 100 and, accordingly, all changes that need to be replicated to a replication volume 104 to ensure that the data blocks 106 of the replication volume 104 are an accurate mirror of the data blocks 102 of the production data volume 100. In accordance with some embodiments of the technique, multiple snapshots can be created serially, and when that occurs, updates to the block map and save volume are performed only for the most recently-created snapshot, so that using a snapshot to identify all changes made to the production data volume 100 subsequent to a particular point in time may involve examining the block map and save volume not only for the snapshot created at the particular point in time of interest, but also any subsequently created snapshot. However, it should be appreciated that the aspects of the technique described herein are not limited in this respect, and can be employed with snapshot utilities in which all updates that occur to the production volume subsequent to the point in time at which a snapshot is created can be reflected in the data structures (e.g., the block map and save volume) of the snapshot itself.

(It should also be appreciated that at least some implementations, including alternative implementations, may use a mapped replica process for maintaining a replica that does not required a copy on first write as described above and does not require a save area. For example, storage system replication may operate on fixed size extents of data residing on a LUN being replicated. Extents typically range from 512 bytes (a disk sector) to multiple MBs. In an example, keeping track of the regions of a LUN that have changed in order to provide incremental updates to a local or remote replica of the LUN (clone or mirror) may be done on an extent basis using a bitmap. Each bit in the bitmap represents an extent in the LUN. A set bit indicates that data in the corresponding extent was modified. The size of an extent is sometimes referred to as the granularity of change tracking.)

As discussed above, a snapshot may, in some implementations, be used for multiple purposes. For example, a snapshot may be used for replication processes as well as backup/versioning processes. Accordingly, in some such implementations, such as the one shown in FIGS. 2 and 3, a snapshot may store information that may be used by a replication module for a replication process as well as information that may be used by a backup/versioning process to create a point in time copy. Such is the case with addresses for data blocks in the save volume 112. In some embodiments, a replication facility examines the block map and uses the data volume addresses to access and retrieve new data from changed data blocks in the production data volume 100, and does not consult the save volume 112 for data. Accordingly, in some such implementations wherein a snapshot is created to support replication, the block map may not be implemented according to the example of FIG. 3 and may not store information regarding the save volume 112. In other implementations, however, the snapshot may be created to also support by a backup/versioning process by forming a point in time copy so that overwritten data may be stored to the save volume 112 and reflected in the block map. Accordingly, it should be appreciated that any suitable information may be stored for any suitable reason in a block map or other data structures of a snapshot, including information not related to replication processes.

Figure 4:
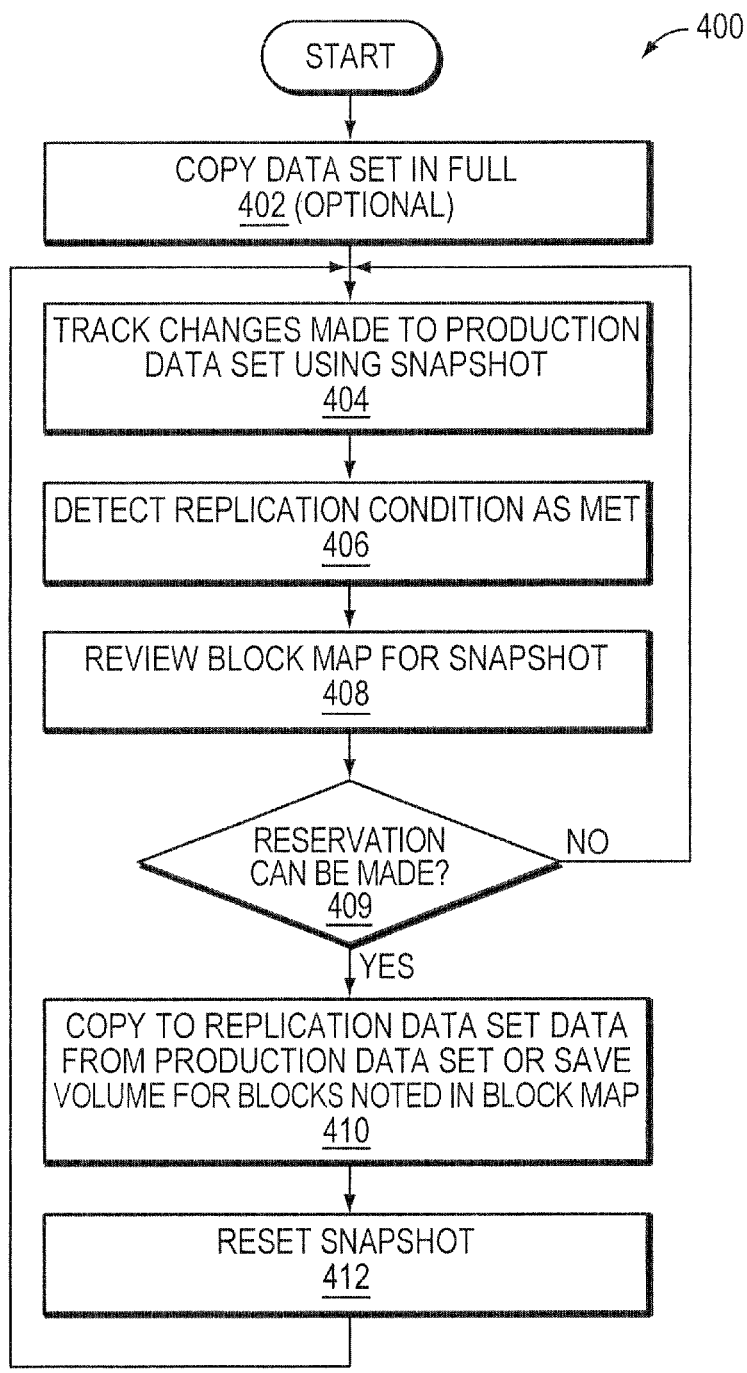
FIGS. 4, 9 are flowcharts of illustrative techniques for performing replication in accordance with some embodiments of the invention.

Replication processes may be carried out in any suitable manner. FIG. 4 shows one exemplary process for performing replication that may be implemented by a replication facility in accordance with some of the embodiments described herein. It should be appreciated, however, that the process 400 of FIG. 4 is merely illustrative of replication processes that may be implemented, as implementations of the technique are not limited in this respect. In the illustrative example described below, the replication process is described as operating on a data set. It should be appreciated that the data set may be any volume of storage or any collection of logical storage objects, such as a file system or a database, as the aspects of the technique described herein are not limited to use with replicating any particular type of data set.

The process 400 of FIG. 4 begins in step 402, in which an initial copy of the data set 100 (e.g., data set 100 in FIG. 1) is optionally made and written to a replication data set (e.g., replication production data set volume 104). (This corresponds to the "synchronization required" option described above.) In this manner, both volumes will be consistent at the start of a replication process. In some implementations, making a full copy of the production data set may take several minutes, hours, or even days, and in such implementations a snapshot may be placed at a starting point of the full-copy process of step 402 and changes made during the full-copy process may be tracked by the snapshot. In other implementations, a snapshot may be placed following completion of the full copy, or at any other time. Regardless of when the snapshot is created, in step 404 changes made to the production data set are tracked using the snapshot, and information regarding the changes is stored in data structures of the snapshot. Tracking changes may be done in any suitable manner, including by the exemplary process 200 described above in connection with FIG. 2, and information may be stored in any suitable manner, including in the illustrative block map 300 of FIG. 3.

Over time, these changes to the production data set are tracked by a snapshot module and stored in the snapshot. Then, in step 406, the replication facility may detect that at least one condition for a replication facility is met. Any suitable condition may be used as a signal that may trigger the replication facility to copy changes that have been tracked by a snapshot to the replication data set. For example, a time-based condition may be used, such as that a replication set be performed every minute, two minutes, or other suitable timeframe. As another example, a number- or size-based condition may be used, such as that a threshold number of data blocks have been changed or that a threshold amount of new data has been written to the production data set since the last replication. As another example, a condition could be completion of a previous replication process, such that replication is performed continuously. As another example, a condition of a replication process could be the creation of a new snapshot or application of a new snapshot to the production data set that will begin tracking changes, such that a previous snapshot can be read without concern that it will need to be updated during reading.

Regardless of the condition(s) for replication, once the condition(s) have been detected as met in step 406, then in step 408 the replication facility begins a replication process by examining one or more data structures of the snapshot to identify changes that have been made since creation of the snapshot. These data structures of the snapshot may be any suitable data structure, and in one embodiment include a block map data structure, such as the one described above in connection with FIG. 3. Through these data structures, the replication facility may identify a list of one or more data blocks that contain new data to be replicated to the replication data set to ensure that the replication data set is a mirrored copy of the production data set. As discussed above, the snapshot data structures may comprise information relating to both previously-allocated data blocks and newly-allocated data blocks—that is, data blocks that stored valid data before the snapshot was created and data blocks that did not store valid data before the snapshot was created.

In step 409, it is determined, e.g., via a reservation request, whether a reservation can be made for volume (TPLU) 104 as described in more detail below. If the newly allocated blocks necessitate an increase in the size of space actually consumed by volume 104, the reservation request is made in the amount of the increase. If the reservation cannot be made, no attempt is made at this time to copy data to the replication data set.

In step 410, using the information from the data structures of the snapshot identifying the changed data blocks, the new data in the data blocks of the production data set that were changed since the snapshot was created is copied from the production data set to the replication data set. This may be done in any suitable manner, including by directly writing the data to the replication data set or by providing the new data to another intermediate component of the computer system, such as a file system server for the replication data set that may be the same or different from a file system server (e.g., file system server 108 in FIG. 1) for the production data set. In some implementations, data to be replicated may, in some cases, be read from data blocks in the save volume, rather than exclusively from the production data set. Such implementations are described in greater detail below.

Once the new data has been copied over in step 410, in step 412, in some embodiments wherein the snapshot is used solely to support replication, the snapshot may be reset to clear it of information relating to changes that have been replicated. Resetting the snapshot may be done in any suitable manner, and may include deleting all information containing the data structures. In this respect, some computer systems may have a limit on the number of snapshot that may be created because of the resources taken to create the data structures to implement a snapshot, so that when a snapshot is created solely to support replication, after it has been used to move the changed data to a replication data set, the snapshot may be deleted so as not to place a restriction on the number of other snapshots that the computer system may be able to create. However, in some other implementations, a snapshot may not be reset, but instead may be maintained to be used by other processes, such as processes that use it to form a point in time copy backup/versioning processes.

Once the snapshot has been reset (in implementations that do reset snapshots), the process may then return to step 404 to track, using a new snapshot, changes made to the production data set after the creation of the new snapshot and replicate those changes. In this way, a continuous replication process may be implemented such that the changes made to the production data set are always replicated to the replication data set as quickly as possible.

In some implementations, a replication process may be performed using two or more snapshots in series and switching between them. Such a process may be used in a way that one or more snapshots may capture changes made to the production data set while another snapshot is being read by the replication facility during a replication process. In this way, a replication process may be carried out using one snapshot while another snapshot is recording changes made to the production data set, such that no time or efficiency is lost in writing to or reading from snapshots.

Figure 5:
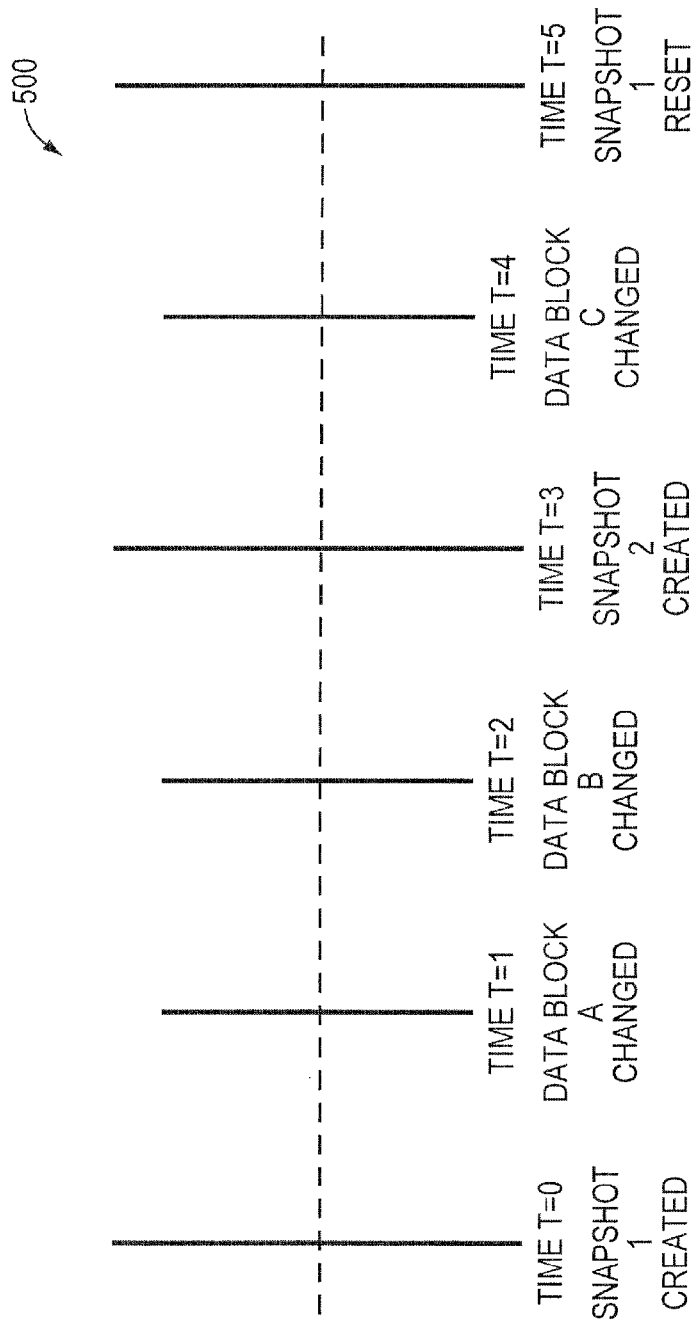
FIG. 5 is a timeline of exemplary operations that may result in changes to one or more data structures tracking changes made to a data volume in accordance with some embodiments of the invention.

One implementation of such a process is shown on a timeline 500 in FIG. 5. In the timeline 500, at time T=0 a first snapshot, snapshot 1, is created and begins tracking changes made to the data volume after time T=0. Accordingly, the snapshot 1 stores in its data structures changes made to the production data volume at times T=1 and T=2, wherein data blocks A and B are changed. At time T=3, a new snapshot, snapshot 2, is created and begins tracking changes made to the production data volume 100 after time T=3. At this time, the snapshot 1 may stop tracking changes made to the data volume 100, as snapshot 2 is capturing information relating to the changes. A replication facility may then begin reviewing the snapshot 1 while the snapshot 2 is tracking changes, and may replicate to the replication data set the new data written by the changes tracked by snapshot 1—in this case, the new data written to data blocks A and B. During this time, while the replication module is replicating the changes, a change may be made to data block C of the production data set. This change is tracked by snapshot 2, and information relating to the change stored in the data structures of snapshot 2. At time T=5, the replication module may complete the replication process and reset snapshot 1. In this case, resetting the snapshot 1 may include clearing the data structures of information relating to replicated changes—the information relating to changes made to data blocks A and B—and creating a new snapshot to track changes made to the production data volume after time T=5. Accordingly, following time T=5, snapshot 1 tracks changes made to the production data volume, and snapshot 2 may be read by the replication facility to replicate changes made by the production data set to the replication data set (e.g., the new data written to data block C). At points in the future, off the timeline 500, the roles of snapshots 1 and 2 may be alternated again and again, with one snapshot tracking changes and another being read by the replication facility to replicate the tracked changes.

It should be appreciated, however, that the implementation shown in the timeline 500 of FIG. 5 is merely exemplary of one process that may be used with multiple snapshots, and that other implementations using multiple snapshots are possible. Further, it should be appreciated that not all implementations of the principles described herein may use multiple snapshots, as in some implementations a single snapshot that is used over and over again may be sufficient to track and replicate changes made to a production data volume.

Further, it should be appreciated that the exemplary process 400 of FIG. 4 is only illustrative of the types of processes that may be implemented in embodiments of the technique. For example, while in FIG. 4, step 410 of the process 400 is described as reading the new data from the production data set, in some embodiments of the technique the replication facility may read contents of a data block from the production data set or from the save volume. This may be done for a variety of reasons. For example, to change the example of FIG. 5 slightly, if at time T=4 the data block B is changed again, then in some cases the contents of data block B may be read from the save volume. This may be done in the case where a replication facility begins a replication process at time T=3 (e.g., upon creation of the snapshot 2) and has not yet copied the new data of data block B as of time T=4. If the replication facility were to read the contents of data block B in the production data set after time T=4, then the contents will be those associated with the change made at time T=4. This can be done in some implementations, as it would be the most recent data in the data block. However, in other implementations it may be desired that the replication data set match the production data set as of a particular time, such as the start of the replication process (i.e., time T=3). In such implementations, the replication facility may, upon recognizing that a change has been made to data block B following the start of the replication process, read from the save volume the contents of the data block B that were copied to the save volume in response to the change made at time T=4 to ensure that the replicated data is accurately reflective of the state of the production data set at the particular time (e.g., time T=3). It should be appreciated, however, that this is only one example of the ways in which a replication process may be implemented, and that the aspects of the techniques are not limited to operating with any particular replication process.

In accordance with some embodiments of the technique, the only snapshots that may be created are those created to support a replication process such as that discussed above. However, it should be appreciated that the aspects of the technique described herein are not limited in this respect, and may also be used in connection with systems wherein snapshot may be created for other reasons, including by users or other aspects of the system to provide one or more point in time copies of the production data set being replicated. In accordance with one embodiment of the technique, even when additional snapshots are created for other reasons, a snapshot created to support a replication process may continue to track all changes to the production data set until a new snapshot is created specifically for the purposes of supporting the replication process. Thus, in accordance with that embodiment of the technique, only the replication snapshot may be examined to determine what data is to be updated to the replication data set to support the replication process at any particular point in time. However, in the alternative embodiment of the technique, when another snapshot is created for any other purpose of (e.g., to create a point in time copy of the production data set), additional changes from that point going forward are not reflected directly in the snapshot created to support replication, but are only recorded in the most recently-created snapshot, so that when a determination is to be made about what data is to be replicated to the replication data set, in addition to examining the data structures of the snapshot created to support replication, the data structures for any subsequently-created snapshot may also be examined.

Figure 6:
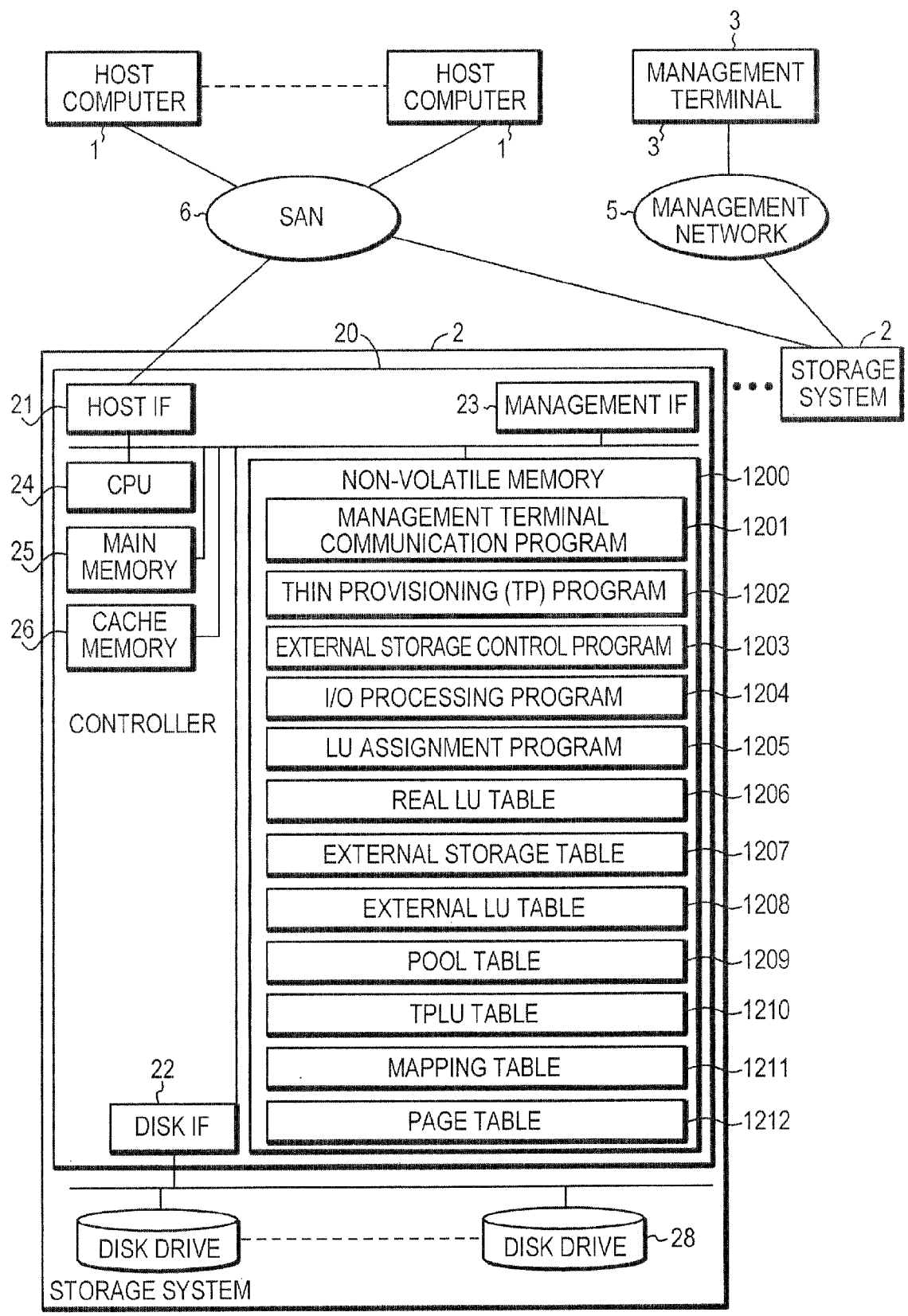
FIGS. 6-8 illustrate aspects one or more data storage systems that may be used in accordance with some embodiments of the invention.

FIG. 6 is a block diagram showing a configuration of a thin provisioning based storage system 2 that may be used in the management of at least volume 104. A computer system includes host computers 1, storage systems 2, a management terminal 3, a management network 5, and a storage area network (SAN) 6. It should be noted that although the block diagram of FIG. 6 shows two host computers 1 and two storage systems 2, the host computer and the storage system may be provided in arbitrary numbers. The host computer may be, include, or be included in file system server 108 and/or client computing device 110. SAN 6 and/or management network 5 may be, include, or be included in communication network 116.

The SAN 6 is a network for connecting the host computers 1 and the storage systems 2. The management network 5 is a network for connecting the storage systems 2 and the management terminal 3.

The host computer 1 is a computer including a CPU (central processing unit), a memory, and an interface. The host computer 1 transmits a read request and a write request to the storage system 2.

The management terminal 3 is a computer for managing the storage system 2.

The storage system 2 includes a controller 20 and disk drives 28.

The controller 20 controls data read and data write with respect to the disk drives 28. In addition, the controller 20 sets storage areas of the disk drives 28 as one or more conventional logical volumes (referred to real LUs as opposed to TPLUs). The storage system 2 provides the real LU to the host computer 1 or the external storage system 2. It should be noted that the storage system 2 recognizes the real LU provided by the external storage system 2 as an external LU.

Further, the controller 20 includes a host interface (host IF) 21, a disk interface (disk IF) 22, a management interface (management IF) 23, a CPU 24, a main memory 25, a cache memory 26, and a non-volatile memory 200.

The host IF 21 is an interface connected to the host computer 1 via the SAN 6. The disk IF 22 is an interface connected to the disk drives 28. The management IF 23 is an interface connected to the management terminal 3 via the management network 5.

The CPU 24 executes various types of processing by executing programs stored in the main memory 25. The main memory 25 temporarily stores programs executed by the CPU 24, information required by the CPU 24, and the like. For example, the main memory 25 stores programs and various types of information including tables read from the non-volatile memory 1200.

The cache memory 26 temporarily stores data written to the disk drive 28 and data read from the disk drives 28.

The non-volatile memory 1200 stores programs and various types of information including tables. For example, the non-volatile memory 1200 stores a management terminal communication program 1200, a thin provisioning (TP) program 1202, an external storage control program 1203, an I/O processing program 1204, an LU assignment program 1205, a real LU table 1206, an external storage table 1207, an external LU table 1208, a pool table 1209, a Thin Provisioning LU table 1210, a mapping table 1211, and a page table 1212.

The management terminal communication program 1201 communicates with the management terminal 3. For example, the management terminal communication program 1201 receives various requests from the management terminal 3 and executes processing according to the received requests.

The thin provisioning program 1202 provides a volume realized by thin provisioning (thin provisioning volume: TPLU) to the host computer 1 or the external storage system 2. The storage system 2 recognizes the TPLU provided by the external storage system 2 as the external LU. In other words, the storage system 2 recognizes both the real LU and the thin provisioning LU provided by the external storage system 2 as external LUs.

The TPLU is recognized as a volume having a virtual capacity larger than a capacity of the storage areas actually assigned to the TPLU.

Figure 7:
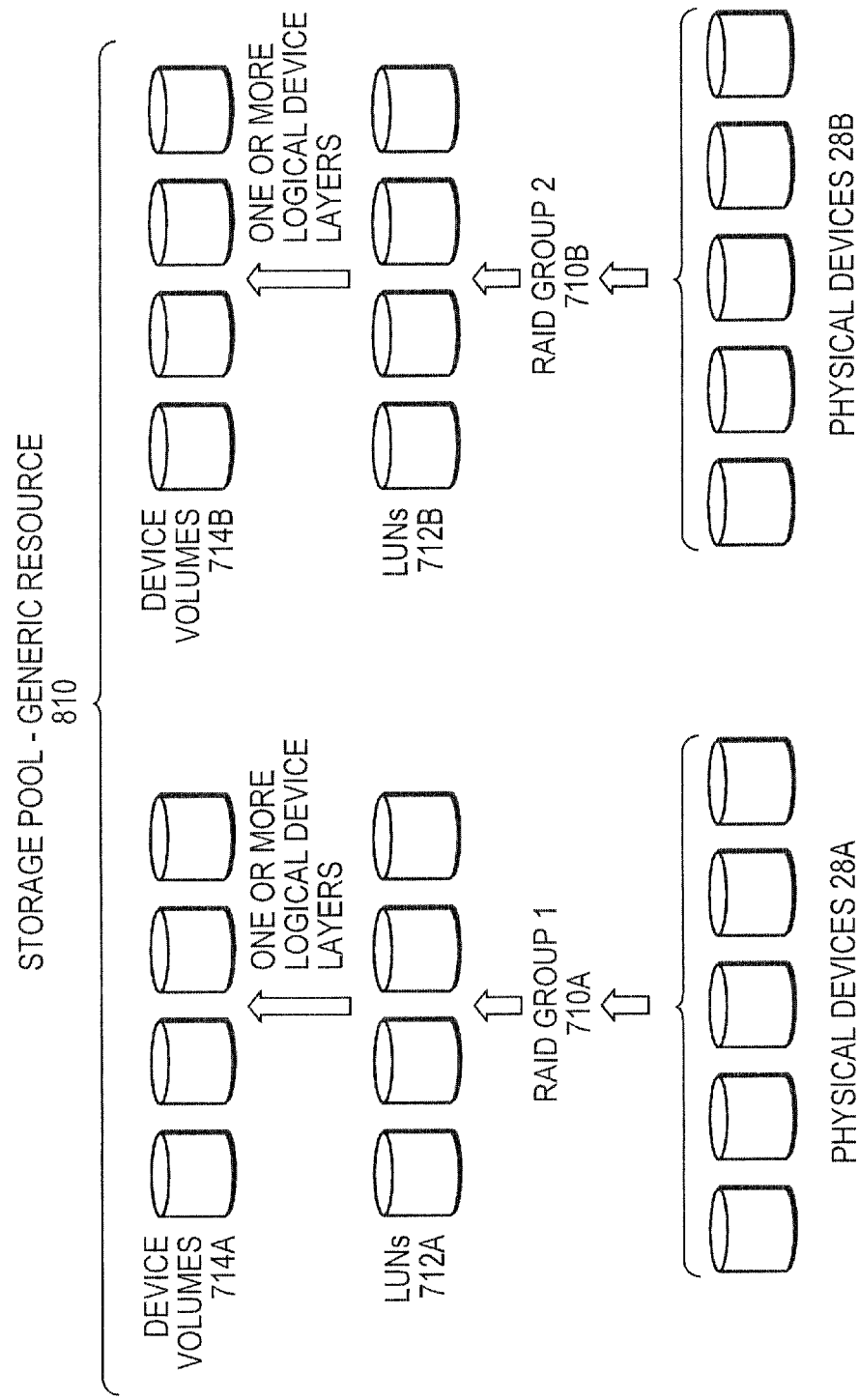
Figure 8:
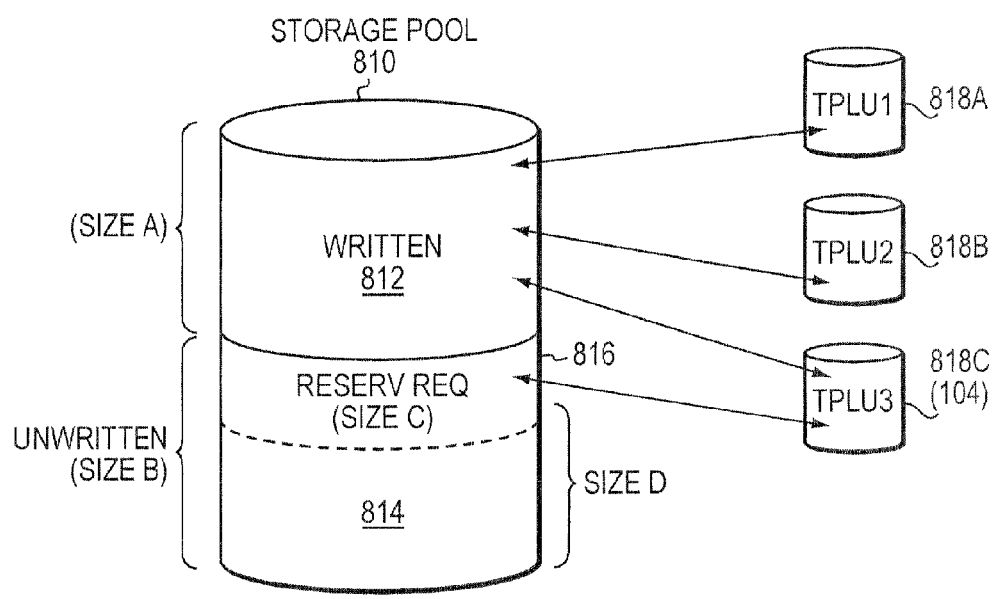

With reference also to FIGS. 7-8 described in more detail below, upon reception of a write request to the TPLU, the thin provisioning program 1202 assigns an unwritten storage area of a storage pool 810 to the TPLU requested for data write in page units. It should be noted that the storage pool is composed of storage areas that can be assigned to the TPLUs. In addition, the unwritten storage area of the storage pool is a storage area that is not yet assigned to any of the TPLUs among all the storage areas included in the storage pool. Further, a page refers to a smallest unit of the storage area that is assigned to the TPLU, for example, a storage area of 64 Kbytes.

The external storage control program 1203 communicates with the other storage system (external storage system) 2 connected to the storage system 2.

The I/O processing program 1204 receives an I/O request with respect to the real LU or the TPLU. It should be noted that the I/O request is either a write request or a read request. When a write request is received, the I/O processing program 1204 writes data requested for data write to the real LU or the TPLU. On the other hand, when a read request is received, the I/O processing program 1204 reads data requested for data read from the real LU or the TPLU. Then, the I/O processing program 1204 transmits the read data to a transmission source of the read request.

The LU assignment program 1205 assigns, upon reception of an LU assignment request, either the real LU or the TPLU to the other storage system 2 (external storage system 2) as the transmission source in response to the LU assignment request.

The real LU table 1206 stores information about the real LUs provided by the storage system 2.

The external storage table 1207 stores information about the other storage system 2 (external storage system 2).

The external LU table 1208 stores information about LUs provided by the external storage system 2.

The pool table 1209 stores information about the storage pool set provided by the storage system 2.

The TPLU table 1210 stores information about the TPLUs provided by the storage system 2.

The mapping table 1211 stores locations at which data requested for data write to the TPLU of the storage system are actually stored.

The page table 1212 stores information about pages (real pages) included in the real LU or the external LU of the storage system 2.

FIG. 7 illustrates an example representing how storage system 2 may construct storage pools from groups of physical devices. For example, RAID Group 1 710A may be formed from physical devices 28A which may include disk drives 28. The data storage system best practices of a policy may specify the particular RAID level and configuration for the type of storage pool being formed. For example, for physical devices 28A on a first data storage system type when forming a high performance storage pool, RAID-5 may be used in a 4+1 configuration (e.g., 4 data drives and 1 parity drive). The RAID Group 1 710A may provide a number of data storage LUNs 712A. An embodiment may also utilize one or more additional logical device layers on top of the LUNs 712A to form one or more logical device volumes 714A. The particular additional logical device layers used, if any, may vary with the data storage system. It should be noted that there may not be a 1-1 correspondence between the LUNs of 712A and the volumes of 714A. In a similar manner, device volumes 714B may be formed or configured from physical devices 28B. Storage pool 810 of the example in FIG. 7 illustrates two RAID groups being used to define a single storage pool although, more generally, one or more RAID groups may be used for form a storage pool in an embodiment using RAID technology.

The data storage system best practices may define how to configure or form the generic storage pools, each storage pool having an associated generic storage pool type. FIG. 7 illustrates one methodology or framework that may be used to form storage pools in an embodiment. In an embodiment following the methodology of FIG. 7, each underlying data storage system such as storage system 2 may have associated best practices specifying how to configure storage pools formed from physical devices in that particular data storage system.

FIG. 8 illustrates an example result of storage system 2 responding to the reservation request of step 409 of FIG. 4. Storage pool 810 has a written area to which mapping table 1211 maps data that has been written to one or more TPLUs such as TPLUs 818A-818C including TPLU 104 which serves as the replication volume as described above. Storage pool 810 has a total capacity (size) of A+B where already written data take up space 812 having size A and the rest of storage pool 810 having size B and representing the unwritten storage areas (also referred to as free space or free pool). When the reservation request for volume 104 is received, specifying size C, if size C is less than size B as shown in the example, storage system 2 is able to satisfy the request and make the reservation 816 in the amount of size C, which reduces the available size of the unwritten storage areas 814 to size D. On the other hand, if the reservation request specifies a size greater than size B, storage system 2 is not able to satisfy the request and cannot make the reservation.

Various computer systems in which implementations operating in accordance with the technique described herein may act. It should be appreciated, however, that these computer systems are merely illustrative of the types of computer systems in which implementations operating according to the technique may act and that any suitable computer system may be used. It should be appreciated that various aspects of the technique may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in managing replication and reservations, the method comprising:
   (a) determining an amount of data storage space at a destination data storage location, the amount corresponding to an amount necessary for a data replication operation in which data associated with a source data location is written to the destination data storage location, wherein the source data is a frozen write ordered consistent image of the source data;
   (b) requesting a thin provisioning reservation on the destination data storage location associated with the data replication operation, the thin provisioning reservation being based on the amount, wherein the amount is less than an amount of free data storage available at the destination storage location; and
   (c) based on whether the thin provisioning reservation succeeded, determining whether to proceed with the data replication operation.

2. The method of claim 1, wherein the destination data storage location comprises a thin provisioned logical volume.

3. The method of claim 1, wherein the destination data storage location has a reported size that is different from its current actual size.

4. The method of claim 1, wherein the thin provisioning reservation can be removed.

5. The method of claim 1, further comprising:
   using the thin provisioning reservation to block another entity from consuming free space in a storage pool on which the destination data storage location is based.

6. The method of claim 1, further comprising:
   based on whether the thin provisioning reservation can be made successfully, avoiding proceeding with the data replication operation.

7. The method of claim 1, wherein the thin provisioning reservation is based on a use-first reservation model.

8. The method of claim 1, wherein the destination data storage location represents a write ordered consistent replica of a source at a previous point in time.

9. The method of claim 1, wherein the data replication operation comprises an asynchronous replication.

10. The method of claim 1, wherein the data replication operation comprises a synchronous replication.

11. The method of claim 1, wherein the data replication operation comprises a clone operation.

12. The method of claim 1, further comprising:
    using the thin provisioning reservation to allow the destination data storage location to grow its consumed space by a reserved amount.

13. The method of claim 1, further comprising:
    determining whether the destination data storage location comprises a thin provisioned volume; and
    basing the use of the thin provisioning reservation on the determination.

14. The method of claim 1, further comprising:
    presenting an option to a user regarding whether data needs to be synchronized to the destination data storage location; and
    basing the use of the thin provisioning reservation on the determination.

15. The method of claim 1, further comprising:
    proceeding with the data replication operation at scheduled intervals.

16. The method of claim 1, wherein a consistency group comprises the destination data storage location, the method further comprising:
   basing whether to proceed with the data replication operation on whether thin provisioning reservations can be made for all members of the consistency group.

17. A system for use in managing replication and reservations, the system comprising:
   (a) first logic configured to determine an amount of data storage space at a destination data storage location, the amount corresponding to an amount necessary for a data replication operation in which data associated with a source data location is written to the destination data storage location, wherein the source data is a frozen write ordered consistent image of the source data;
   (b) second logic configured to request a thin provisioning reservation on the destination data storage location associated with the data replication operation, the thin provisioning reservation being based on the amount, wherein the amount is less than an amount of free data storage available at the destination storage location; and
   (c) third logic configured to determine, based on whether the thin provisioning reservation succeeded, whether to proceed with the data replication operation.

18. The system of claim 17, wherein the destination data storage location comprises a thin provisioned logical volume.

19. The system of claim 17, wherein the destination data storage location has a reported size that is different from its current actual size.

20. The system of claim 17, wherein the thin provisioning reservation can be removed.

* * * * *